United States Patent
Chung et al.

(10) Patent No.: US 7,835,831 B2
(45) Date of Patent: Nov. 16, 2010

(54) POWER-DOWN CONTROL METHOD OF FUEL CELL HYBRID ELECTRIC VEHICLE

(75) Inventors: Sung Jin Chung, Suwon-si (KR); Ho Sung Kang, Seoul (KR); Sang Hoon Lee, Yongin-Si (KR); Soon Il Jeon, Yongin-si (KR); Kyu Il Lee, Yongin-si (KR); Nam Woo Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 619 days.

(21) Appl. No.: 11/940,162

(22) Filed: Nov. 14, 2007

(65) Prior Publication Data
US 2008/0140275 A1    Jun. 12, 2008

(30) Foreign Application Priority Data
Dec. 12, 2006 (KR) .................. 10-2006-0126628

(51) Int. Cl.
*H01M 8/04* (2006.01)
(52) U.S. Cl. .................. 701/22; 307/9.1; 307/10.1; 307/10.6; 180/65.21; 180/65.24
(58) Field of Classification Search .................. 701/22; 307/9.1, 10.1, 10.6, 10.7; 180/65.21, 65.24
See application file for complete search history.

(56) References Cited
U.S. PATENT DOCUMENTS
7,058,487 B2 * 6/2006 Hara et al. .................. 701/22
7,279,855 B2 * 10/2007 Tahara et al. .................. 318/46
7,605,552 B2 * 10/2009 Kawakami et al. .......... 318/148

FOREIGN PATENT DOCUMENTS
| JP | 02-174502 | 7/1990 |
|---|---|---|
| JP | 2003-151600 | 5/2003 |
| JP | 2004-139950 | 5/2004 |
| JP | 2004-253220 | 9/2004 |

\* cited by examiner

*Primary Examiner*—Thomas G Black
*Assistant Examiner*—Marthe Marc Coleman
(74) *Attorney, Agent, or Firm*—Morgan, Lewis & Bockius LLP

(57) ABSTRACT

A power-down control method of a fuel cell hybrid vehicle includes determining an operation mode when a key-off command is input. If the mode is a fuel cell mode, the method includes: converting a low voltage DC-DC converter connected to an auxiliary battery to a boost mode; maintaining a driving state of a high voltage part, powered by voltage from the auxiliary battery and boosted by the low voltage DC-DC converter; subsequently stopping operation of a fuel cell stack and turning off the high voltage part; and subsequently turning off the low voltage DC-DC converter. If the mode is a hybrid mode, the method includes: maintaining a driving state of the high voltage part, powered by voltage from a super capacitor; subsequently stopping operation of the fuel cell stack and turning off the high voltage part; subsequently turning off the DC-DC converters; and subsequently cutting power of the super capacitor.

10 Claims, 6 Drawing Sheets

POWER-DOWN CONTROL METHOD OF FUEL CELL HYBRID ELECTRIC VEHICLE

CROSS-REFERENCE TO RELATED APPLICATION

This application claims priority under 35 U.S.C. §119(a) of Korean Patent Application No. 10-2006-0126628, filed on Dec. 12, 2006, the entire contents of which are incorporated herein by reference.

BACKGROUND OF THE INVENTION (a) Field of the Invention

The present invention relates to a power-down control method of a fuel cell hybrid electric vehicle (FC-HEV). More particularly, the present invention relates to a power-down control method of a fuel cell-super capacitor hybrid electric vehicle that can safely power down high voltage parts by optimally controlling the order in which elements of the fuel cell system are turned off during key-off.

(b) Background Art

A typical fuel cell oxidizes a hydrogen-containing fuel such as liquefied natural gas (LNG), liquefied petroleum gas (LPG), methanol, etc, and converts the chemical energy produced during the reaction to electric energy.

If a fuel cell is used as the only power source of an electric vehicle, the fuel cell powers all loads of the vehicle, which decreases the efficiency of the fuel cell.

Moreover, voltage required by a driving motor cannot be supplied since output voltage is rapidly reduced at high speeds, which decreases the acceleration performance of the vehicle.

Furthermore, if a sudden load is applied to the vehicle, the output voltage of the fuel cell drops momentarily and thereby sufficient power is not supplied to the driving motor, thus deteriorating vehicle performance.

In addition, since the fuel cell has unidirectional output characteristics, it is impossible to recover energy from the driving motor while braking the vehicle, thus deteriorating the efficiency of the vehicle system.

In an attempt to solve such problems, a fuel cell-battery hybrid, or fuel cell-super capacitor hybrid system has been developed. Such a system includes a high voltage battery or a super capacitor in addition to the fuel cell.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A power-down control method of a fuel cell hybrid vehicle includes determining an operation mode when a key-off command is input. If the operation mode is a fuel cell mode, the method includes: converting a low voltage DC-DC converter connected to an auxiliary battery to a boost mode; maintaining a driving state of a high voltage part, powered by voltage from the auxiliary battery and boosted by the low voltage DC-DC converter; subsequently stopping operation of a fuel cell stack and turning off the high voltage part; and subsequently turning off the low voltage DC-DC converter.

The high voltage part may be at least one of: an air processing system, a fuel processing system, and a thermal management system.

A high voltage DC-DC converter connected to the high voltage part may be turned off when the low voltage DC-DC converter is converted to the boost mode.

If the high power part is powered by the voltage from the auxiliary battery and boosted by the low voltage DC-DC converter, the method may cool at least one high voltage electrical part, such as a motor, a motor controller, a converter, and an inverter.

If the operation mode is a hybrid mode, the method includes: maintaining a driving state of the high voltage part, powered by voltage from a super capacitor; subsequently stopping operation of the fuel cell stack and turning off the high voltage part; subsequently turning off the DC-DC converters; and subsequently cutting power of the super capacitor.

The method may also include cooling at least one high voltage electrical part before stopping the operation of the fuel cell stack.

Figure 1:
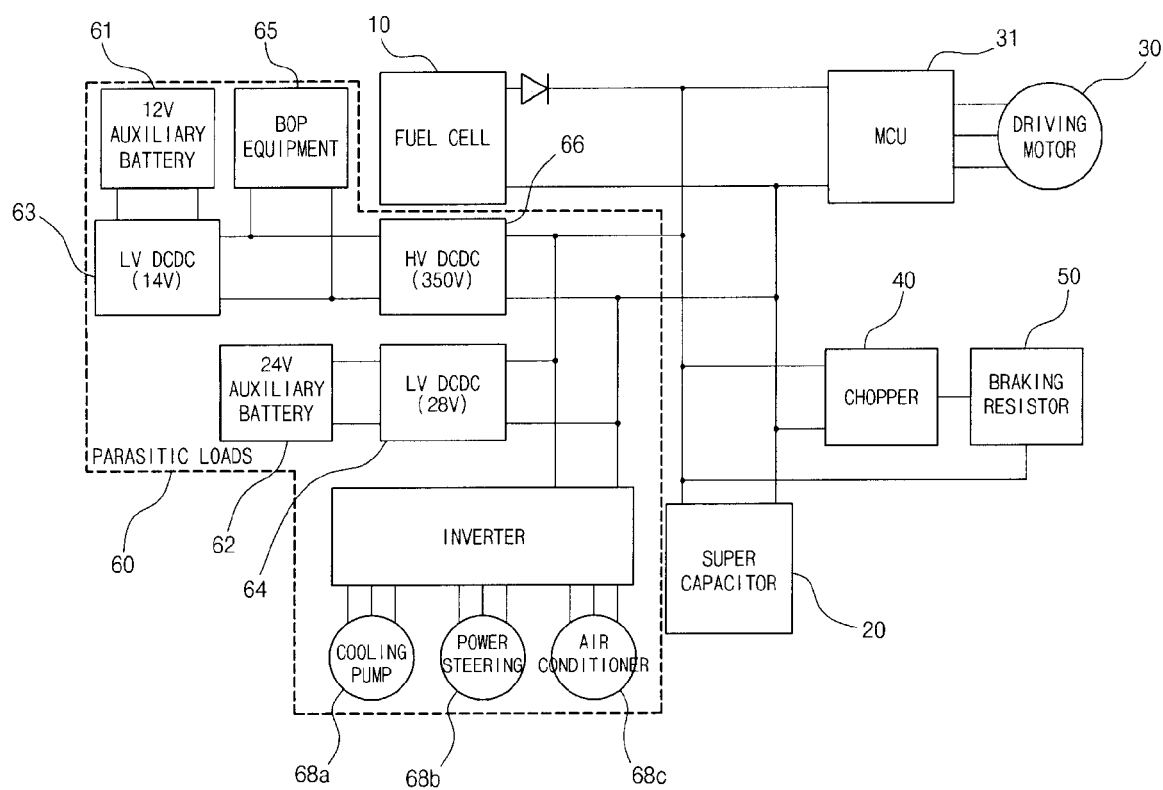
FIG. 1 is a schematic diagram of a fuel cell-super capacitor hybrid electric vehicle.

Reference numerals set forth in the Drawings includes reference to the following elements as further discussed below:

10: fuel cell
11: fuel cell stack
12: stack PDU
13: PDU
20: super capacitor
30: driving motor
31: MCU
60: parasitic loads
61: 12 V auxiliary battery
62: 24 V auxiliary battery
63 and 64: low voltage DC-DC converters
65: BOP equipment
66: high voltage DC-DC converter
68a: cooling pump

DETAILED DESCRIPTION OF EXEMPLARY EMBODIMENTS

Referring to FIG. 1, a typical fuel cell-super capacitor hybrid system comprises a fuel cell 10 and a super capacitor 20, both providing power to a motor 30, a motor control unit (MCU) 31 for controlling the motor 30, a chopper circuit 40 for realizing a multifunction through a switching operation of a semiconductor switch (IGBT), and a braking resistor 50 related to an auxiliary braking process.

Moreover, parasitic loads 60 related to various auxiliary machine parts, auxiliary parts related to the fuel cell operation, etc. comprise 12V and 24V auxiliary batteries 61 and 62 for supplying power to various parts mounted in the vehicle, low voltage DC-DC converters (LV DCDC) 63 and 64, a high voltage DC-DC converter (HV DCDC) 66, an inverter 67, balance of plant (BOP) equipment 65 comprising an air processing system (APS), a fuel processing system (FPS), a thermal management system (TMS), etc., which are required for driving a fuel cell system, cooling pumps 68a for cooling the high voltage parts and the fuel cell, an air conditioner 68b, and a power steering unit 68c.

Figure 2:
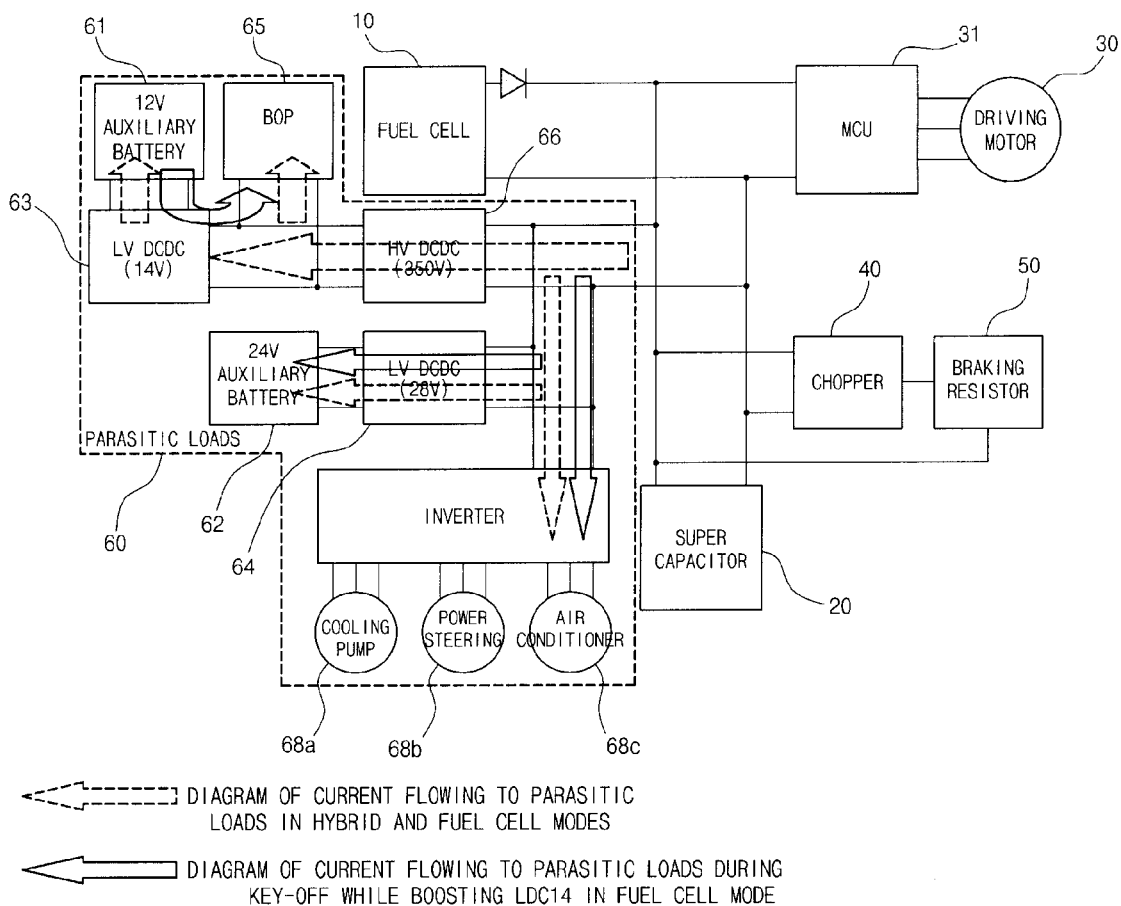
FIG. 2 is a current flow diagram in a boost mode of DC-DC converters connected to auxiliary batteries according to exemplary embodiments of the present invention.

In the system as depicted in FIG. 1, in a fuel cell mode (where the motor 30 is driven only by power supplied from the fuel cell 10) and in a hybrid mode (where the motor 30 is driven by power supplied from the super capacitor 20 as well as from the fuel cell 10), currents for the auxiliary machines flow in the directions indicated by the arrows of FIG. 2 to supply high voltage power to the 12V and 24V auxiliary batteries 61 and 62, the BOP equipment 65, the cooling pumps 68a, the air conditioner 68b and the power steering 68c, through the LV DCDC (14V) 63 and LV DCDC (28V) 64 and the HV DCDC (350V) 66.

A power-up (key-on) and an operation mode thereof has been partially studied for a vehicle in which two auxiliary batteries 61 and 62 of 12V and 24V are mounted. However, sequence control during power-down (key-off) has not been proposed in the art.

Accordingly, it is necessary to develop a power-down order of high voltage parts during key-off.

Reference will now be made in detail to the preferred embodiments of the present invention, examples of which are illustrated in the drawings attached hereinafter, wherein like reference numerals refer to like elements throughout. The exemplary embodiments are described below so as to explain the present invention by referring to the figures.

Embodiments of the present invention provide a sequence control method that can safely power down high voltage parts during key-off in a power operation mode of a fuel cell-super capacitor hybrid electric vehicle. The method may use an HV DCDC (14V), an HV DCDC (28V), a power disconnect unit (PDU), a stack PDU, and an inverter to brake the vehicle, driving in a hybrid mode or in a fuel cell mode.

The vehicle may comprise low voltage parts (e.g. 12V and/or 24V) that use auxiliary batteries, and high voltage parts (e.g. 350V), such as BOP equipment comprising an air processing system (APS), a fuel processing system (FPS), a thermal management system (TMS), etc.

If voltage is not applied to the BOP equipment until the operation of the fuel cell is completed during key-off in the fuel cell mode (i.e. where the super capacitor cannot be used as a power supply), an abnormal power-down may occur, causing fatal damage to the parts.

Although the vehicle may include a hybrid mode, where the fuel cell and the super capacitor are operated simultaneously, if an abnormality occurs in the super capacitor system, the hybrid mode is usually switched to the fuel cell mode, where only the fuel cell is operated. It is therefore necessary to optimize the power-down sequence for both cases.

FIG. 2 is a diagram depicting current applied to BOP equipment in a boost mode of DC-DC converters connected to auxiliary batteries in the present invention, in which the current flows to the BOP equipment until the operation of the fuel cell is normally completed during key-off while driving in the fuel cell mode, as will be described later.

Figure 3:
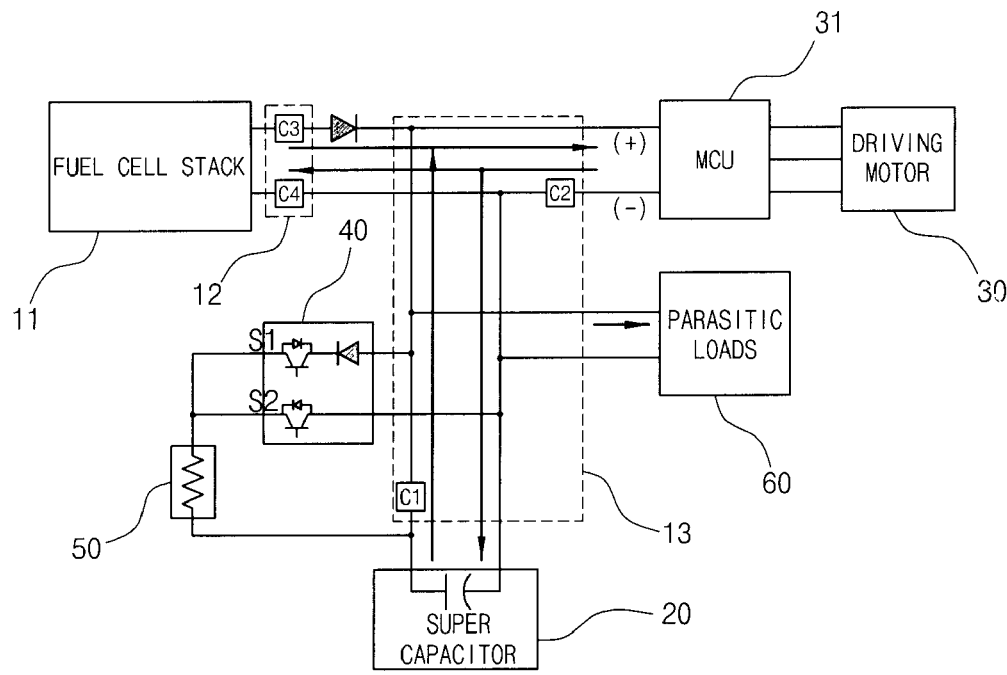
FIGS. 3 and 4 are diagrams showing power supply states in accordance with operation modes in a fuel cell-super capacitor hybrid system according to exemplary embodiments of the present invention.
Figure 4:
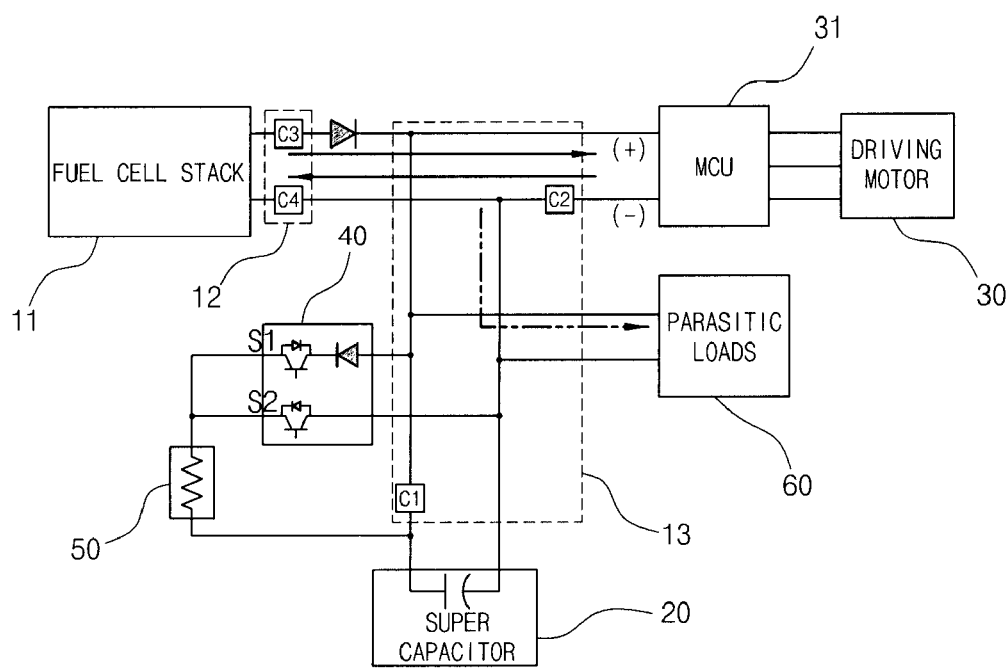

FIGS. 3 and 4 are diagrams showing power supply states in accordance with operation modes in the fuel cell-super capacitor hybrid system and especially showing current flow states in accordance with operation modes of the fuel cell-super capacitor hybrid electric vehicle. FIG. 3 denotes the hybrid mode and FIG. 4 denotes the fuel cell mode.

In FIGS. 3 and 4, parasitic loads comprising various auxiliary machine parts 68a, 68b and 68c, BOP equipment 65, LV DCDC 63 and 64, HV DCDC 66 and inverter 67 are indicated generally at reference numeral 60.

As mentioned above, in the fuel cell mode, where the motor 30 is driven only by the fuel cell 10, as well as in the hybrid mode, where the motor 30 is driven by power from the super capacitor 20 as well as from the fuel cell 10, currents for auxiliary machines, other than the power for driving the motor 30, flow in the directions indicated by the arrows of FIG. 1 and FIG. 2 to supply high voltage power to the 12V and 24V auxiliary batteries 61 and 62, the BOP equipment 65, the cooling pumps 68a, the air conditioner 68b, and the power steering 68c, through the LV DCDC (14V) 63 and LV DCDC (28V) 64 and the HV DCDC (350V) 66.

Under such circumstances, the inverter 67 and the cooling pumps 68a should be operated for a predetermined time for cooling the high voltage parts during key-off, and especially the BOP equipment 65 should be operated by supplying power continuously until the operation of the fuel cell 10 is normally completed in the power-down control process.

Referring to FIGS. 3 and 4, in the hybrid mode of FIG. 3, the fuel cell stack 11 and the super capacitor 20 supply power for driving the motor 30 and the parasitic loads 60 such as the BOP equipment 65 in a state where a stack disconnect unit (PDU) 12 and a main PDU 13 are turned on, that is, electrically connected thereto.

The stack PDU 12 and the main PDU 13 comprise a relay controlled by a hybrid control unit (HCU).

In the fuel cell mode of FIG. 4, the fuel cell stack 11 supplies power to the motor 30 and the parasitic loads 60 in a state where the stack PDU 12 is turned on, and the power of the super capacitor 20 is cut by the PDU 13 (related relay off).

Figure 5:
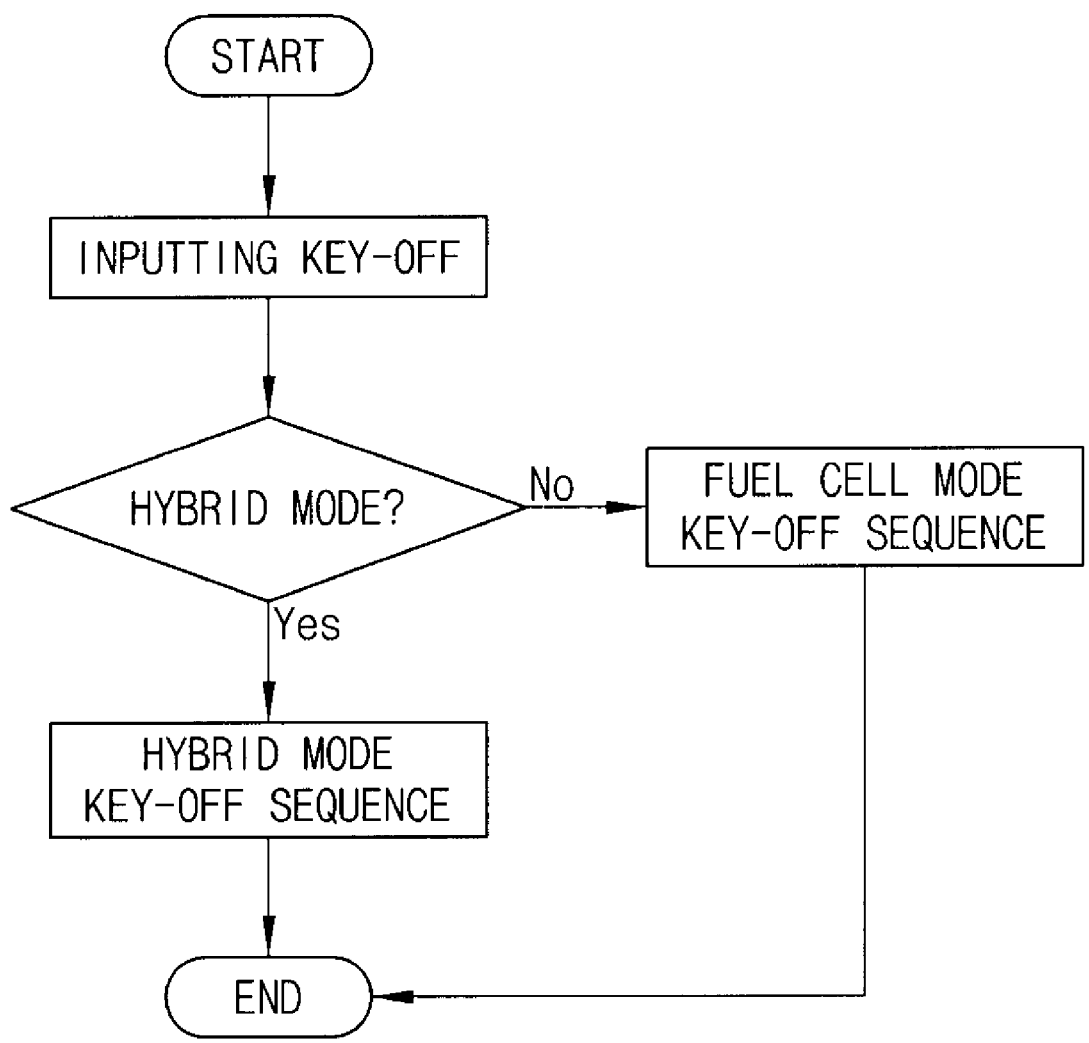
FIG. 5 is a flowchart briefly illustrating a control method used during key-off according to exemplary embodiments of the present invention.

If a key-off command is input, the key-off sequence control is performed according to the current mode, i.e. the hybrid mode or the fuel cell mode, as depicted in FIG. 5.

Such control processes in accordance with the two modes will be described in more detail with reference to FIGS. 6 and 7 as follows.

Figure 6:
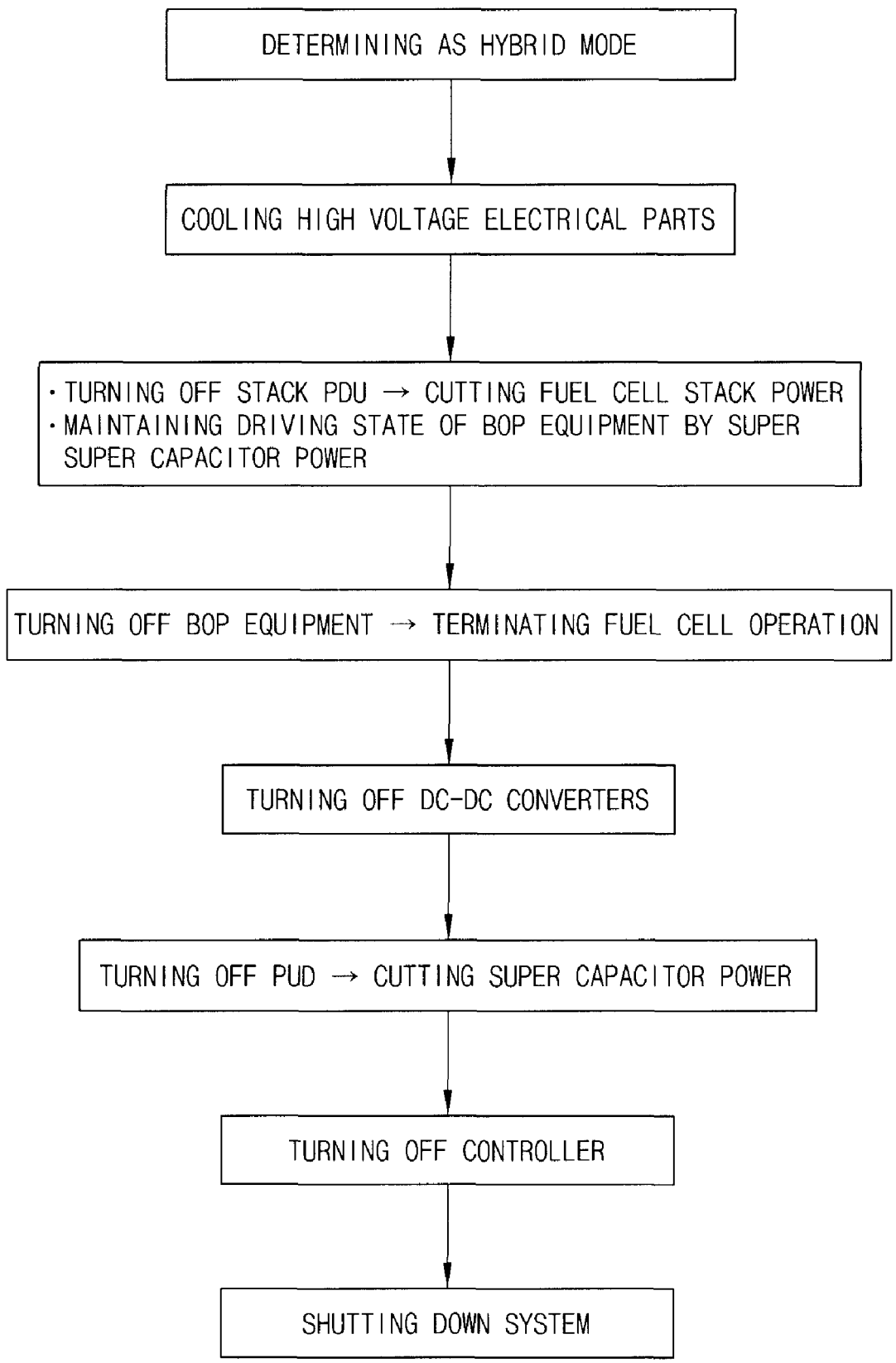
FIG. 6 is a detailed flowchart illustrating a key-off sequence according to exemplary embodiments of the present invention during key-off in a hybrid mode.
Figure 7:
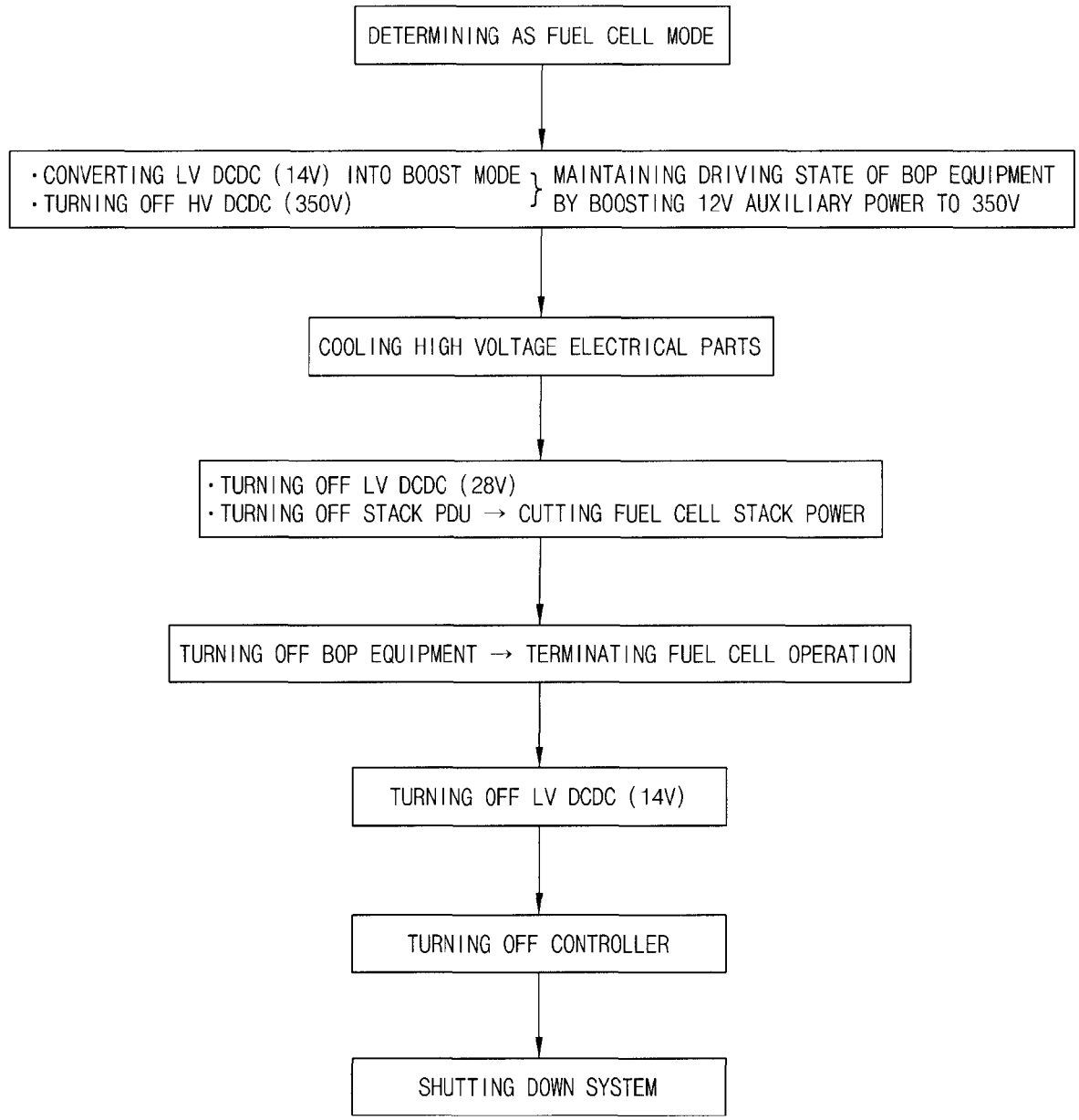
FIG. 7 is a detailed flowchart illustrating a key-off according to exemplary embodiments of the present invention during key-off in a fuel cell mode.

If the detected operation mode is the hybrid mode when the key-off command is input, as depicted in FIG. 3, the key-off sequence control of FIG. 6 is carried out, whereas, if it is the fuel cell mode as depicted in FIG. 4, the key-off sequence control of FIG. 7 is performed.

Referring to FIG. 6, if the detected mode is the hybrid mode when the key-off command is input, a first controller, e.g., a vehicle control unit (VCU), controls cooling of various high voltage electrical parts, such as a motor, a motor controller, converters, inverters, and the like, of which temperatures are increased while driving, just before cutting the power of the fuel cell and the super capacitor in accordance with the key-off input.

The cooling process of the high voltage electrical parts is performed by controlling a cooling device mounted in each of the parts, which can be designed and implemented by a person of ordinary skill in the art.

Once the cooling of the high voltage electrical parts is completed, a second controller, e.g., a hybrid control unit (HCU) turns off the stack PDU 12 to cut the power of the fuel cell stack 11 and, at this time, since only the power of the super capacitor 20 is applied to all the high voltage electrical parts, the BOP equipment 65 maintains the driving state, thanks to the power provided by the super capacitor 20.

Subsequently, the second controller sends a stop command for stopping the operation of the fuel cell 10 to the fuel cell controller and thereby the fuel cell controller turns off the BOP equipment 65, thereby terminating the operation of the fuel cell 10.

Next, the second controller stops the operation of the DC-DC converters 63, 64 and 66 and cuts the power of the super capacitor 20 by turning off the PDU 13.

The second controller is turned off after cutting the power of the super capacitor 20 and thereby the key-off process is completed, thus shutting down the system.

Referring to FIG. 7, if the detected mode is the fuel cell mode when the key-off command is input, since the power of the super capacitor 20 is already cut, the BOP equipment 65 is powered by the auxiliary battery 61 until the fuel cell operation is terminated.

That is, the second controller, e.g., HCU, converts the low voltage DC-DC converter 63, i.e., LV DCDC (14V), connected to the 12V auxiliary battery 61 into a boost mode and, at the same time, turns off the high voltage DC-DC converter 66, i.e., HV DCDC (350V), coupled to the BOP equipment 65 so as to support the boost mode of the low voltage DC-DC converter 63.

The 14V output from the auxiliary battery 61 is boosted to a high voltage of 350V for operating the BOP equipment 65 by the boosting operation of the low voltage DC-DC converter 63, i.e., LV DCDC (14V), and the BOP equipment 65 maintains the driving state, thanks to the 350V provided by the auxiliary battery 61 through the low voltage DC-DC converter 63.

Subsequently, as in the hybrid mode, the first controller, e.g., VCU controls cooling of the high voltage electrical parts and, once the cooling process is completed, the second controller turns off the low voltage DC-DC converter 64, i.e., LV DCDC (28V), connected to the 24V auxiliary battery 62 and then turns off the stack PDU 12, thus cutting the power of the fuel cell stack 1.

At this time, the BOP equipment 65 continuously maintains the driving state, thanks to the 350V voltage provided by the 12V auxiliary battery 61 through the low voltage DC-DC converter 63.

After this, the second controller sends a stop command for stopping the operation of the fuel cell 10 to the fuel cell controller and thereby the fuel cell controller turns off the BOP equipment 65, thereby terminating operation of the fuel cell 10.

Moreover, the second controller turns off the rest low voltage DC-DC converter 63, i.e., LV DCDC (14V), then the second controller is turned off, and thereby the key-off process is completed, thus shutting down the system.

As described above, the power-down control method of a fuel cell-super capacitor hybrid electric vehicle in accordance with the present invention can safely power down high voltage parts by optimally controlling the turn-off order of the various elements constituting the fuel cell system, depending on the operation mode during key-off.

The present invention prevents abnormal power-down of the fuel cell and the various parts, thereby preventing fatal damage to the parts.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A power-down control method of a fuel cell hybrid vehicle comprising:
   determining an operation mode when a key-off command is input; and
   if the operation mode is a fuel cell mode:
      converting a low voltage DC-DC converter connected to an auxiliary battery to a boost mode;
      maintaining a driving state of a high voltage part, powered by voltage from the auxiliary battery and boosted by the low voltage DC-DC converter;
      subsequently stopping operation of a fuel cell stack and turning off the high voltage part; and
      subsequently turning off the low voltage DC-DC converter.

2. The method of claim 1, wherein the high voltage part comprises at least one of: an air processing system, a fuel processing system, and a thermal management system.

3. The method of claim 1, wherein a high voltage DC-DC converter connected to the high voltage part is turned off when the low voltage DC-DC converter is converted to the boost mode.

4. The method of claim 1, further comprising, if the high power part is powered by the voltage from the auxiliary battery and boosted by the low voltage DC-DC converter, cooling at least one high voltage electrical part.

5. The method of claim 4, wherein the at least one high voltage electrical part comprises at least one of: a motor, a motor controller, a converter, and an inverter.

6. A power-down control method of a fuel cell hybrid vehicle comprising:
   determining an operation mode when a key-off command is input; and
   if the operation mode is a hybrid mode:
      maintaining a driving state of a high voltage part, powered by voltage from a super capacitor;
      subsequently stopping operation of a fuel cell stack and turning off the high voltage part;
      subsequently turning off DC-DC converters; and
      subsequently cutting power of the super capacitor.

7. The method of claim 6, further comprising, if the operation mode is the hybrid mode, cooling at least one high voltage electrical part before stopping the operation of the fuel cell stack.

8. The method of claim 7, wherein the at least one high voltage electrical part comprises at least one of: a motor, a motor controller, a converter, and an inverter.

9. The method of claim 6, wherein the high voltage part comprises at least one of: an air processing system, a fuel processing system, and a thermal management system.

10. A power-down control method of a fuel cell hybrid vehicle comprising:
   determining an operation mode when a key-off command is input; and
   if the operation mode is a fuel cell mode:
      converting a low voltage DC-DC converter connected to an auxiliary battery to a boost mode;
      maintaining a driving state of a high voltage part, powered by voltage from the auxiliary battery and boosted by the low voltage DC-DC converter;
      subsequently stopping operation of a fuel cell stack and turning off the high voltage part; and
      subsequently turning off the low voltage DC-DC converter;
   and if the operation mode is a hybrid mode:
      maintaining the driving state of the high voltage part, powered by voltage from a super capacitor;
      subsequently stopping operation of the fuel cell stack and turning off the high voltage part;
      subsequently turning off the DC-DC converter; and
      subsequently cutting power of the super capacitor.

* * * * *